United States Patent
Kanei et al.

(10) Patent No.: US 10,691,798 B2
(45) Date of Patent: Jun. 23, 2020

(54) ANALYSIS DEVICE, ANALYSIS METHOD, AND ANALYSIS PROGRAM

(71) Applicant: NIPPON TELEGRAPH AND TELEPHONE CORPORATION, Chiyoda-ku (JP)

(72) Inventors: Fumihiro Kanei, Musashino (JP); Takeshi Yada, Musashino (JP); Mitsuaki Akiyama, Musashino (JP); Yuta Takata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 124 days.

(21) Appl. No.: 15/762,742

(22) PCT Filed: Sep. 9, 2016

(86) PCT No.: PCT/JP2016/076693
§ 371 (c)(1),
(2) Date: Mar. 23, 2018

(87) PCT Pub. No.: WO2017/068889
PCT Pub. Date: Apr. 27, 2017

(65) Prior Publication Data
US 2018/0218154 A1    Aug. 2, 2018

(30) Foreign Application Priority Data
Oct. 19, 2015    (JP) .................................. 2015-205674

(51) Int. Cl.
*G06F 21/56*    (2013.01)
*G06F 11/36*    (2006.01)
(Continued)

(52) U.S. Cl.
CPC ........ *G06F 21/563* (2013.01); *G06F 9/44589* (2013.01); *G06F 11/36* (2013.01);
(Continued)

(58) Field of Classification Search
CPC ....................... G06F 9/44589; G06F 2221/033
See application file for complete search history.

(56) References Cited

U.S. PATENT DOCUMENTS

2004/0205411 A1    10/2004   Hong et al.
2008/0184208 A1*    7/2008   Sreedhar ............... G06F 21/577
                                                                 717/128
(Continued)

FOREIGN PATENT DOCUMENTS

EP          2 696 288 A1    2/2014

OTHER PUBLICATIONS

Chin, Erika, et al. "Analyzing inter-application communication in Android." Proceedings of the 9th international conference on Mobile systems, applications, and services. ACM, 2011. (Year: 2011).*
(Continued)

*Primary Examiner* — Madhuri R Herzog
(74) *Attorney, Agent, or Firm* — Oblon, McClelland, Maier & Neustadt, L.L.P.

(57) ABSTRACT

A static code analysis unit specifies an implementation portion of a Java code in a cooperation mechanism that sends and receives data between an Android application implemented by the Java code and Web content implemented by a JavaScript code and specifies a method in which a return value that can be called by the JavaScript code is set in the cooperation mechanism; a code converting unit inserts, into the Java code, a call code of a simulation function in which the return value of the specified method is inserted into an argument; and a data flow analysis unit analyzes a data flow by observing, by using the argument
(Continued)

and the return value of the simulation function and the specified method, the data that is sent and received between the Android application implemented by the Java code and the Web content implemented by the JavaScript code.

4 Claims, 11 Drawing Sheets

(51) Int. Cl.
  *G06F 9/445* (2018.01)
  *G06F 21/54* (2013.01)
  *G06F 21/62* (2013.01)

(52) U.S. Cl.
  CPC .......... *G06F 11/3612* (2013.01); *G06F 21/54* (2013.01); *G06F 21/6218* (2013.01); *G06F 2221/033* (2013.01)

(56) References Cited

U.S. PATENT DOCUMENTS

| | | | |
|---|---|---|---|
| 2014/0047538 | A1 | 2/2014 | Scott et al. |
| 2014/0059690 | A1 | 2/2014 | Li et al. |
| 2014/0130153 | A1 | 5/2014 | Dolby et al. |
| 2014/0130154 | A1 | 5/2014 | Dolby et al. |
| 2014/0173571 | A1 | 6/2014 | Gluck et al. |
| 2015/0067660 | A1 | 3/2015 | Pistoia et al. |
| 2016/0234246 | A1* | 8/2016 | Pistoia ................ H04L 63/1433 |

OTHER PUBLICATIONS

Jiang, Yajin Zhou Xuxian, and Zhou Xuxian. "Detecting passive content leaks and pollution in android applications." Proceedings of the 20th Network and Distributed System Security Symposium (NDSS). 2013. (Year: 2013).*

Kim, Jinyung, et al. "ScanDal: Static analyzer for detecting privacy leaks in android applications." MoST 12.110 (2012): 1. (Year: 2012).*

Gordon MI, Kim D, Perkins JH, Gilham L, Nguyen N, Rinard MC. Information flow analysis of android applications in droidsafe. InNDSS Feb. 8, 2015 (vol. 15, No. 201, p. 110). (Year: 2015).*

Wei, Fengguo, Sankardas Roy, and Xinming Ou. "Annandroid: A precise and general inter-component data flow analysis framework for security vetting of android apps." Proceedings of the 2014 ACM SIGSAC Conference on Computer and Communications Security. ACM, 2014. (Year: 2014).*

Avdiienko, Vitalii, et al. "Mining apps for abnormal usage of sensitive data." Proceedings of the 37th International Conference on Software Engineering—vol. 1. IEEE Press, 2015. (Year: 2015).*

Mongiovi M, Giannone G, Fornaia A, Pappalardo G, Tramontana E. Combining static and dynamic data flow analysis: A hybrid approach for detecting data leaks in Java applications. InProceedings of the 30th Annual ACM Symposium on Applied Computing Apr. 13, 2015 (pp. 1573-1579). (Year: 2015).*

Gibler, Clint, et al. "Android Leaks: automatically detecting potential privacy leaks in android applications on a large scale." International Conference on Trust and Trustworthy Computing. Springer, Berlin, Heidelberg, 2012. (Year: 2012).*

Guarnieri, Salvatore, et al. "Saving the world wide web from vulnerable JavaScript." Proceedings of the 2011 International Symposium on Software Testing and Analysis. 2011. (Year: 2011).*

International Search Report dated Dec. 6, 2016 in PCT/JP2016/076693 filed Sep. 9, 2016.

Arzt, S. et al., "FlowDroid: Precise Context, Flow, Field, Object-sensitive and Lifecycle-aware Taint Analysis for Android Apps", Proceedings of the 35$^{th}$ ACM SIGPLAN Conference on Programming Language Design and Implementation (PLDI), Jun. 2014, 11 total pages (URL: http://www.bodden.de/pubs/far+14flowdroid.pdf).

Reps, T. et al., "Precise Interprocedural Dataflow Analysis via Graph Reachability", Proceedings of the 22$^{nd}$ ACM SIGPLAN-SIGACT Symposium on Principles of Programming Languages (POPL), 1995, 13 total pages (URL: http//www.cs.cornell.edu/courses/cs711/2005fa/papers/rhs_popI95.pdf).

Extended European Search Report dated Apr. 3, 2019 in European Patent Application No. 16857207.1, 6 pages.

\* cited by examiner

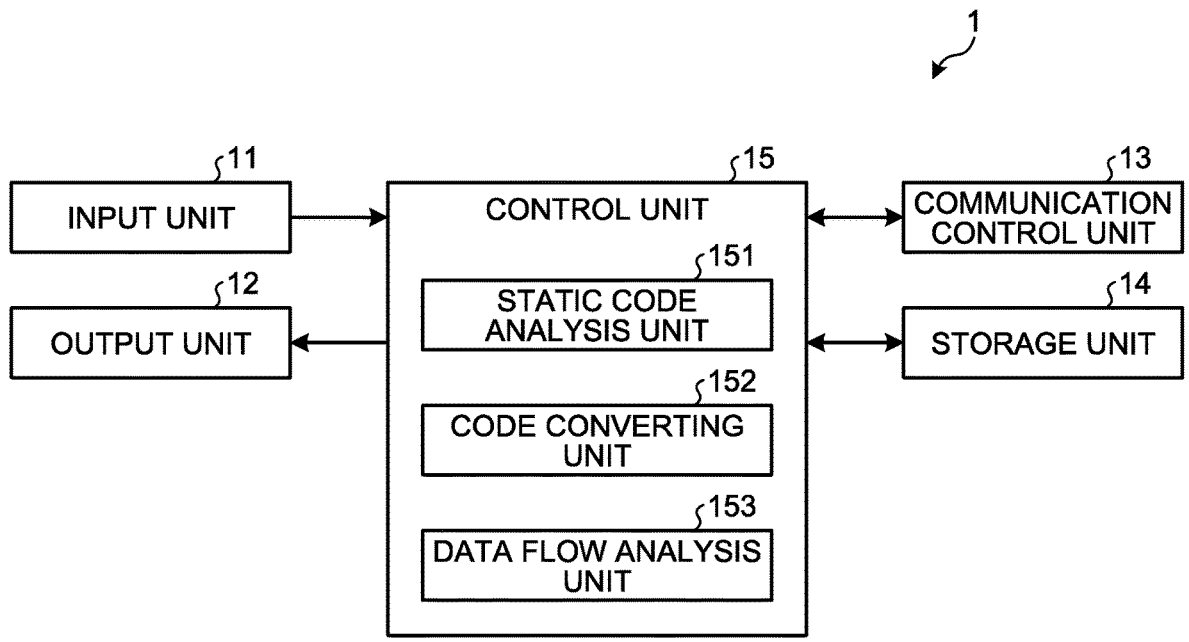

FIG.3

```
1  public class JSIClass{
2          @JavascriptInterface
3          public String getInfo1(){
4              String data=getData();
5              return data;
6          };
7
8          private void log(String str){
9              Log.d("log", str);
10         };
11 }
```

FIG.4

```
1  private void sendMsg(String msg){
2          Log.d("msg", msg)
3  };
```

```
1  //API LEVEL 17 OR MORE
2  public String getData(){
3          String Data=getVal();
4          return data;
5  };
```
A1: UNABLE TO CALL FROM JavaScript

```
1  @JavascriptInterface
2  public void sendMsg(String msg){
3          Log.d("msg", msg)
4  };
```
A2: UNABLE TO SEND DATA TO JavaScript

```
1  @JavacvriptInterface
2  public String getInfo1(){
3          String info=getInfo();
4      return info;
5  };
```
A3: ABLE TO SENT DATA TO JavaScript

ANALYSIS DEVICE, ANALYSIS METHOD, AND ANALYSIS PROGRAM

FIELD

The present invention relates to an analysis device, an analysis method, and an analysis program.

BACKGROUND

In general, an example of information leakage includes threats targeted for portable information terminals having mounted thereon Android (registered trademark) or the like. An attacker allows a malicious Android application (hereinafter, referred to as Android malware) to be installed into a terminal of a user by using various methods. The installed Android malware sends important information, such as personal information on the user and a unique ID of a device, stored in the terminal to the source of the attacker.

The technology that analyzes such Android malware is broadly divided into two types, i.e., a dynamic analysis technology that allows Android malware to be operated in an isolated environment and observes behaviors at the time of execution and a static analysis technology that deciphers execution codes by using a reverse engineering technology.

There is a static taint analysis technology as one of static analysis technologies that detect Android malware that leaks information. The static taint analysis technology detects whether data acquired by a function (hereinafter, referred to as Source) that acquires information targeted for leakage is input to a function (hereinafter, referred to as Sink) that leaks information outside the terminal, i.e., detects whether a data flow from the Source to the Sink is present. If the data flow from the Source to the Sink is detected, this means that an execution path for performing information leakage is present in an execution code of the analysis target application (see Non-Patent Document 1).

The static taint analysis technology is based on the technology of data flow analysis that collects sets of values that can be obtained by data at various places in the execution code. If the technology of data flow analysis is used, it is possible to analyze whether the value of a variable A at a certain point in, for example, a program reaches a variable B at another point, i.e., whether both the variables A and B take the same value (see Non-Patent Document 2).

In this way, conventionally, the static taint analysis technology targeted for the Android application uses the execution code of the Android application (hereinafter, also referred to as an application code) developed in Java (registered trademark) as an analysis target.

CITATION LIST

Non-Patent Document

Non-Patent Document 1: Steven Arzt, Siegfried Rasthofer, Christian Fritz, Eric Bodden, Alexandre Bartel, Jacques Klein, Yves Le Traon, Damien Octeau, and Patrick McDaniel, "FlowDroid: Precise Context, Flow, Field, Object-sensitive and Lifecycle-aware Taint Analysis for Android Apps", [online], June, 2014, In Proceedings of the 35th ACM SIGPLAN Conference on Programming Language Design and Implementation (PLDI), [searched on Aug. 27, 2015], Internet <URL: http://www.bodden.de/pubs/far+14flowdroid.pdf>

Non-Patent Document 2: T. Reps, S. Horwitz, and M. Sagiv, "Precise Interprocedural Dataflow Analysis via Graph Reachability", [online], 1995, In Proceedings of the 22nd ACM SIGPLAN-SIGACT Symposium on Principles of Programming Languages (POPL), [searched on Aug. 27, 2015], Internet <URL: http://www.cs.cornell.edu/courses/cs711/2005fa/papers/rhs-pop195.pdf>

SUMMARY

Technical Problem

However, in the conventional static taint analysis technology, because the analysis target is a single code, in some cases, information leakage is not appropriately detected when Source and Sink are not completed in the Java application code. For example, if an attacker abuses a cooperation mechanism between Java codes in Android and JavaScript (registered trademark) codes, the attacker may sometimes avoid detection of information leakage based on the static taint analysis technology described above.

Specifically, in the development of the Android application, a function, such as an embedded browser, called WebView is used. The WebView is one of components related to a display of a screen and is formed of only frames for displaying web pages instead of using the standard user interface (UI), such as an address bar and back/forward buttons, in a browser. If WebView is used, it is possible to display Web content formed of codes, such as HTML, CSS, and JavaScript, in the Android application. Furthermore, an API for sending and receiving data between application codes and Web content that is red into WebView is provided.

If JavascriptInterface that is one of APIs described above is used, it is possible to insert a Java object in an application code into a JavaScript code that is read into WebView. A method included in the inserted Java object can be called from the JavaScript code and thus data can be sent and received between Java and JavaScript as an argument and a return value of the method.

After having sent the information acquired from Source in the application code to the JavaScript code by using the JavascriptInterface, the attacker can leak the information outside the terminal via Sink in JavaScript code. In this case, in the static taint analysis technology, because only the application codes are targeted for analysis, Sink included in the JavaScript code is not able to be detected. Consequently, the attacker can avoid detection of information leakage based on the static taint analysis technology.

In this way, in the conventional static taint analysis technology, because the analysis target is a single code, it is not able to detect information leakage if Source and Sink are not completed in the Java application code. Namely, if the cooperation mechanism between Java codes and JavaScript codes is used and if information leaks after sending and receiving the information between Java and JavaScript, information leakage is not able to be detected by the static taint analysis technology.

Accordingly, the present invention has been conceived in light of the circumstances described above, and an object thereof is to detect information leakage without being evaded by an attacker.

Solution to Problem

An analysis device includes: a specifying unit that specifies an implementation portion of a first code in a cooperation mechanism that sends and receives data between an application implemented by the first code and an application implemented by a second code different from the first code and that specifies a method in which a return value that can be called by the second code is set in the cooperation mechanism; an inserting unit that inserts, into the first code, a call code of a simulation function in which the return value of the specified method is inserted into an argument; and an analysis unit that analyzes a data flow by observing, by using the argument and the return value of the simulation function and the specified method, the data that is sent and received between the application implemented by the first code and the application implemented by the second code.

Advantageous Effects of Invention

According to the present invention, it is possible to detect information leakage without being evaded by an attacker.

BRIEF DESCRIPTION OF DRAWINGS

FIG. 1 is a schematic diagram illustrating, in outline, the configuration of an analysis device according to an embodiment of the present invention.

FIG. 2 is a diagram illustrating a process performed by a static code analysis unit according to the embodiment.

FIG. 3 is a diagram illustrating a process performed by the static code analysis unit according to the embodiment.

FIG. 4 is a diagram illustrating a process performed by the static code analysis unit according to the embodiment.

DESCRIPTION OF EMBODIMENTS

Figure 5:
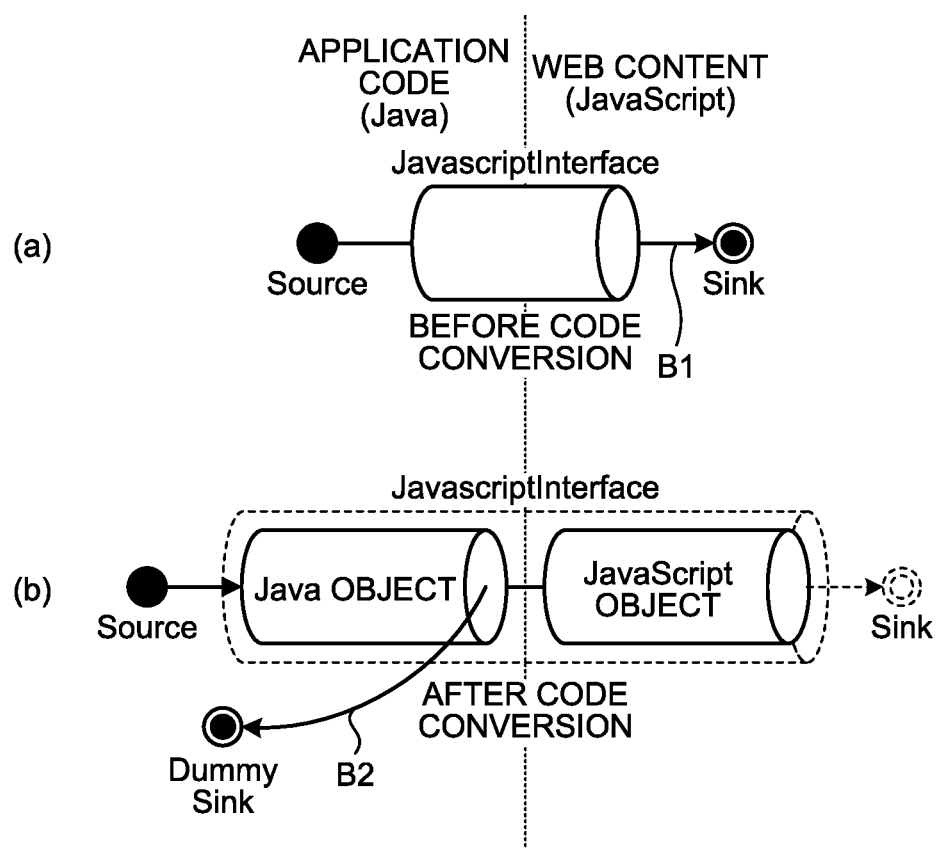
FIG. 5 is a diagram illustrating a process performed by a code converting unit according to the embodiment.

Preferred embodiments of the present invention will be explained in detail with reference to accompanying drawings. The present invention is not limited to the embodiments. In the drawings, the same reference numerals are used for the same components.

[Configuration of Analysis Device]

First, the outline of the configuration of an analysis device according to the embodiment will be described with reference to FIG. 1. An analysis device 1 is implemented by a general purpose computer, such as a work station or a personal computer, and includes an input unit 11, an output unit 12, a communication control unit 13, a storage unit 14, and a control unit 15.

The input unit 11 is implemented by an input device, such as a keyboard or a mouse, and inputs various kinds of instruction information to the control unit 15. The output unit 12 is implemented by a display device, such as a liquid crystal display, a printing device, such as a printer, or an information communication device and outputs results of, for example, analysis processes, which will be described later, to an operator. The communication control unit 13 is implemented by a network interface card (NIC) or the like and controls communication between an external device and the control unit 15 via the telecommunications line, such as a local area network (LAN) or the Internet.

The storage unit 14 is implemented by a semiconductor memory device, such as a random access memory (RAM) and a flash memory, or a storage device, such as a hard disk and an optical disk. In the storage unit 14, a processing program that operates the analysis device 1, data that is used when the processing program is being executed, and the like are previously stored or temporarily stored every time the process is performed. Furthermore, the storage unit 14 may also be configured such that the storage unit 14 performs communication with the control unit 15 via a telecommunications line, such as a LAN or the Internet.

An arithmetic processing device, such as a central processing unit (CPU), executes the processing program stored in a memory, whereby the control unit 15 functions, as illustrated in FIG. 1, as a static code analysis unit 151, a code converting unit 152, and a data flow analysis unit 153.

The static code analysis unit 151 functions as a specifying unit. Namely, the static code analysis unit 151 specifies an implementation portion of a Java code in the cooperation mechanism that sends and receives data between an Android application implemented by the Java code and Web content implemented by a JavaScript code and specifies a method in which a return value that can be called by the JavaScript code is set in the cooperation mechanism.

Specifically, first, the static code analysis unit 151 specifies, in an execution code of the Android application targeted for analysis, the implementation portion of a call code of the JavascriptInterface that is the cooperation mechanism between the Android application and the JavaScript.

FIG. 2 is a diagram illustrating a part of a Java code including a call code of the addJavascriptInterface that is an example of the JavascriptInterface. Here, the addJavascriptInterface is an API for inserting a Java object into a JavaScript code. In the example illustrated in FIG. 2, the implementation portion of the call code of the addJavascriptInterface is specified on line 12.

Then, the static code analysis unit 151 specifies, based on the implementation content of the call code of the specified JavascriptInterface, the method that can be called by a JavaScript code and in which a return value is set.

In the example illustrated in FIG. 2, first, the class of the Java object inserted into the JavaScript (hereinafter, referred to as a JSI class) is specified as JSIClass based on the implementation content on lines 8 and 12. Namely, based on the implementation content on line 12, the Java object inserted into JavaScript is a variable jsi. Because, based on the implementation content on line 8, the variable jsi is declared as the object of JSIClass, the class of this Java object is specified as JSIClass and the JSI class in the example illustrated in FIG. 2 is specified as JSIClass.

Then, from among methods declared in the specified JSIClass, the static code analysis unit 151 specifies the method that can be called by a JavaScript code and in which a return value is set. FIG. 3 is a diagram illustrating the list of methods declared in JSIClass. In the example illustrated in FIG. 3, as the method that can be called by a JavaScript code and in which a return value is set, for example, getInfo1( ) is specified.

Furthermore, in the methods declared in the same JSI class, as illustrated in FIG. 4, various types of methods are present. From among these methods, only public methods can be called by the JavaScript code. Furthermore, if an operation is performed in an environment in which the API level of Android is equal to or greater than 17, the annotation of "JavascriptInterface" needs to be added. Hereinafter, the method that is declared in the JSI class and that can be called by the JavaScript code is referred to as a JSI method.

As indicated by A1 illustrated in FIG. 4, the method that is not able to be called by the JavaScript code is not targeted for the method specified by the static code analysis unit 151. Furthermore, as indicated by A2 as an example, even if the method can be called by the JavaScript code, a void type method in which a return value is not set and that is not able to send data to JavaScript is not also targeted for the method specified by the static code analysis unit 151. Thus, as indicated by A3 as an example, the static code analysis unit 151 sets, to a specific target, the method in which a return value is set and that can be called by a JavaScript code and can send data to JavaScript (hereinafter, referred to as an observation target JSI method).

The code converting unit 152 functions as an inserting unit. Namely, the code converting unit 152 inserts, into a Java code, a call code of a simulation function in which a return value of a specified method is inserted into an argument. In the following, the outline of the process performed by the code converting unit 152 will be described with reference to FIG. 5. Before this process, as indicated by (a) illustrated in FIG. 5, there may be a case in which a data flow B1 from Source implemented by the Java code to Sink in the Web content implemented by the JavaScript code via JavascriptInterface is present. In this case, the code converting unit 152 converts, as indicated by (b) illustrated in FIG. 5, the data flow B1 to Sink implemented by the JavaScript code to a data flow B2 flowing to DummySink that is a simulation function implemented by the Java code. In this way, by being converted to the data flow B2, the data flow B1 from Java to JavaScript can be observed based on the static taint analysis that uses, as the target, a data flow between objects in a single code.

Figure 6:
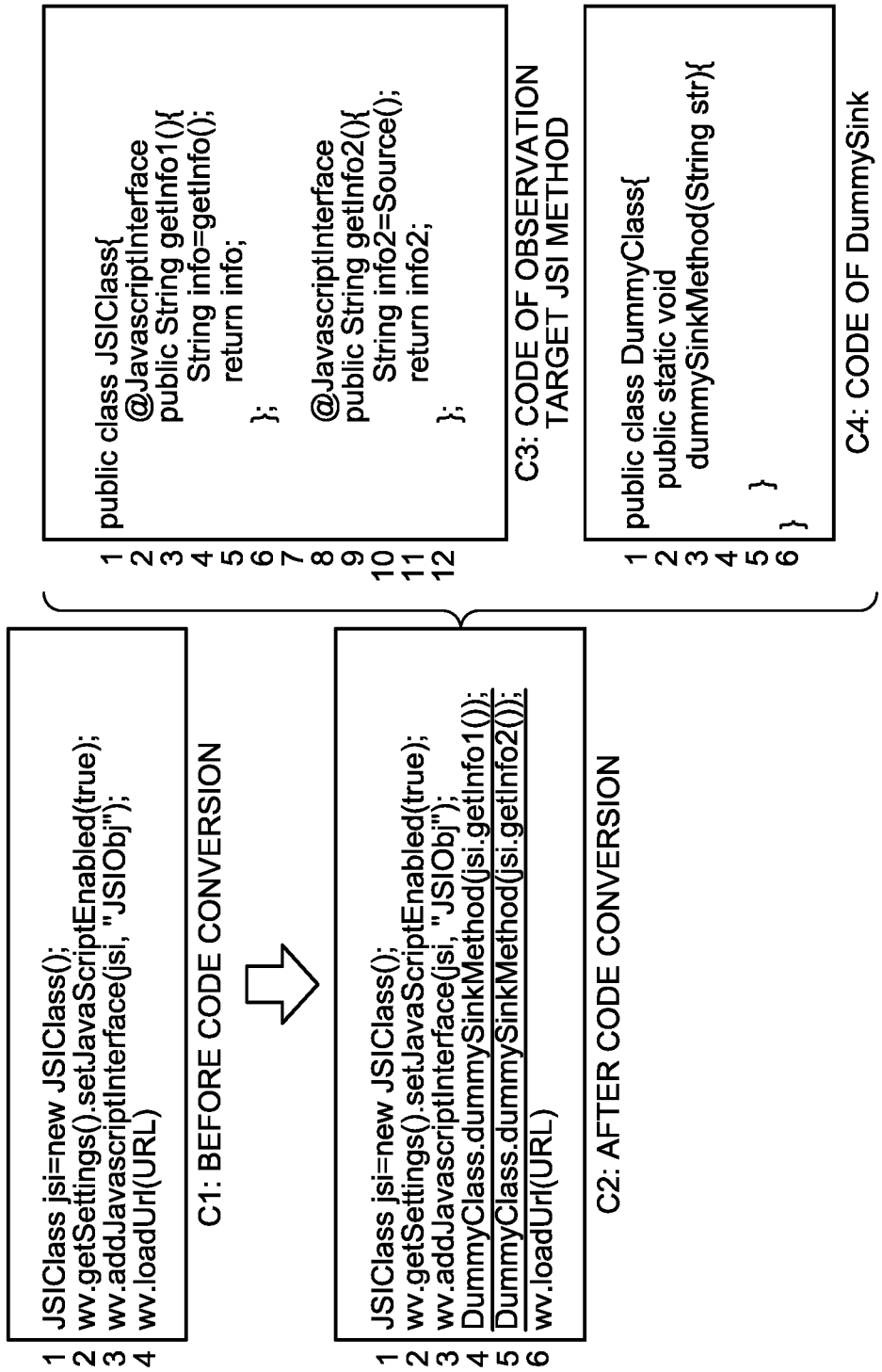
FIG. 6 is a diagram illustrating a process performed by the code converting unit according to the embodiment.

Specifically, as illustrated in FIG. 6, the code converting unit 152 converts the Java code. Namely, as indicated by C4 illustrated in FIG. 6, the code converting unit 152 declares DummySink. Furthermore, the code converting unit 152 inserts, into the java code indicated by C1 as an example, the call codes of DummySink in each of which a return value of the observation target JSI method is input to an argument, as indicated on lines 4 and 5 by C2 as an example.

In FIG. 6, as the observation target JSI method declared in JSIClass, as indicated by C3, two types of getInfo1( ) and getInfo2( ) are illustrated as examples. In this case, the code converting unit 152 implements, as indicated on lines 4 and 5 by C2, each of the two types of return values of the observation target JSI method such that each of the return values is input to DummySink, i.e., an argument of DummyClass.dummySinkMethod( ).

Furthermore, when declaring DummySink, the code converting unit 152 allows the type of argument of DummySink to match the type of the return value of the observation target JSI method. In the example illustrated in FIG. 6, as indicated on lines 3 and 9 by C3, the type of each of the return values of getInfo1( ) and getInfo2( ) is String. In contrast, as indicated on line 3 by C4, the type of the argument of DummyClass.dummySinkMethod( ) is String. In this way, the code converting unit 152 allows the type of the argument of DummySink to match the type of the return value of the observation target JSI method. Furthermore, if various types of variables are present, the code converting unit 152 declares DummySink for each type.

Furthermore, in the process performed by the static code analysis unit 151 or the code converting unit 152, an application code may also be converted to an arbitrary assembly language, an intermediate representation, or the like as long as the application code can be reconverted to the original byte code.

Figure 7:
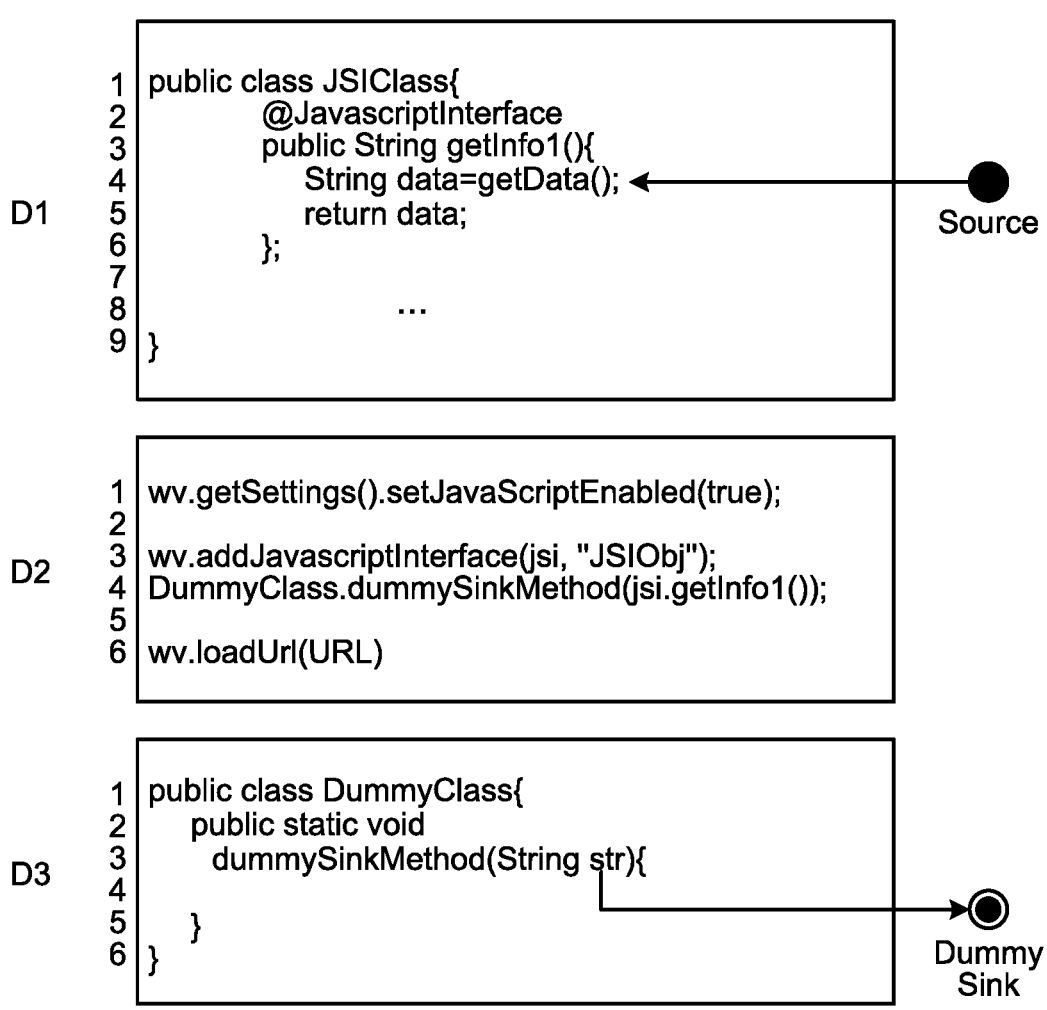
FIG. 7 is a diagram illustrating a process performed by a data flow analysis unit according to the embodiment.
Figure 8:
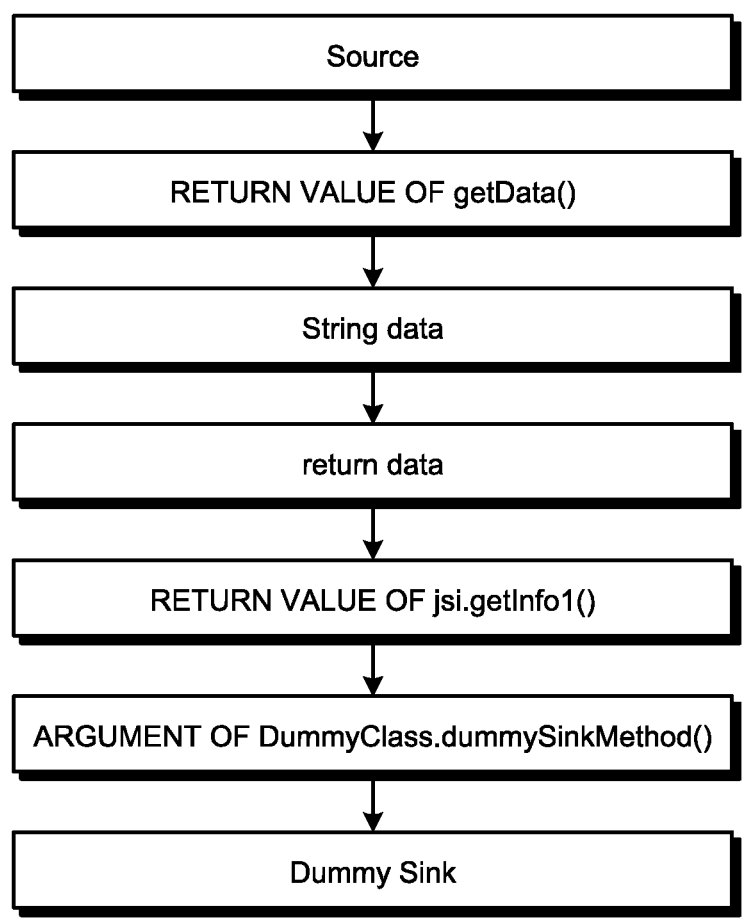
FIG. 8 is a diagram illustrating a process performed by the data flow analysis unit according to the embodiment.

The data flow analysis unit 153 functions as an analysis unit. Namely, the data flow analysis unit 153 analyzes a data flow by observing, by using an argument and a return value of DummySink and the specified method, the data that is sent and received between the method and DummySink. Specifically, the data flow analysis unit 153 observes, in the Java code that is used as the target and that is converted by the code converting unit 152 described above illustrated in FIG. 7, as illustrated in FIG. 8, the argument and the return value of DummySink and the specified method and analyzes the data flow from arbitrary Source in the Java code to DummySink.

Namely, as Source, i.e., as the observation target JSI method, the data flow analysis unit 153 traces the data acquired by, for example, getInfo1( ) (see line 3 illustrated in D1 of FIG. 7) by using, for example, the static taint analysis technology. This information is propagated, as illustrated in FIG. 8, in the order of the return value of getData( ), String data and return data (see lines 4 and 5 illustrated in D1 of FIG. 7), the return value of jsi.getInfo1( ) (see line 4 in D2 illustrated in FIG. 7), and the argument of Dummy.dummySinkMethod( ) as DummySink (see line 3 illustrated in D3 of FIG. 7).

In this way, if a data flow from arbitrary Source in the Java code to DummySink is detected, this means that the data acquired by Source is sent to the JavaScript code, i.e., Web content. Thus, by analyzing the data flow to DummySink, it is possible to analyze the data flow to the Web content. The method of static taint analysis that analyzes the data flow is not particularly limited.

Figure 9:
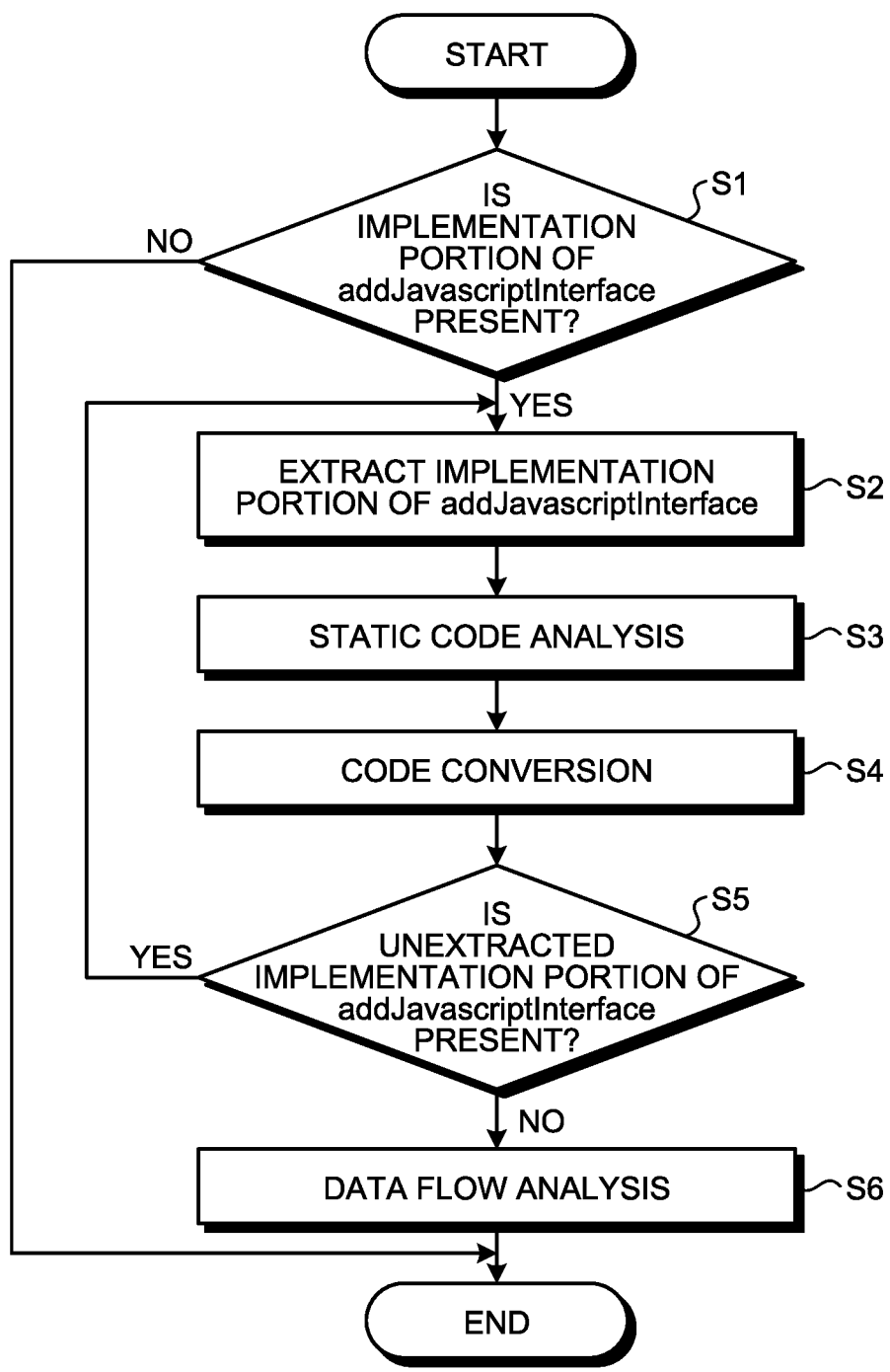
FIG. 9 is a flowchart illustrating the flow of an analysis process according to the embodiment.

[Analysis Process] In the following, the flow of the analysis process performed by the analysis device 1 will be described with reference to the flowcharts illustrated in FIGS. 9 to 12. First, the flowchart illustrated in FIG. 9 is started at the timing in which, for example, an input indicating the start of the analysis process is received via the input unit 11.

The static code analysis unit 151 checks whether, for example, an implementation portion of a call code of the addJavascriptInterface, as an example of JavascriptInterface, is present in an execution code of the Android application targeted for analysis (Step S1). If the implementation portion of the addJavascriptInterface is not present (No at Step S1), the analysis process is ended. In contrast, if the implementation portion of the addJavascriptInterface is present (Yes at Step S1), the static code analysis unit 151 extracts the implementation portion (Step S2) and performs the static code analysis process (Step S3). The static code analysis process will be described later with reference to FIG. 10.

Then, the code converting unit 152 performs the code conversion process (Step S4). The code conversion process will be described later with reference to FIG. 11.

Then, the static code analysis unit 151 checks whether an unextracted implementation portion of a call code of addJavascriptInterface is present (Step S5). If an unextracted implementation portion of the call code of the addJavascriptInterface is present (Yes Step S5), the static code analysis unit 151 returns to the process at Step S2.

In contrast, if no unextracted implementation portion of a call code of addJavascriptInterface is present (No at Step S5), the data flow analysis unit 153 performs the data flow analysis process (Step S6). The data flow analysis process will be described later with reference to FIG. 12. Consequently, a series of analysis processes is ended.

Figure 10:
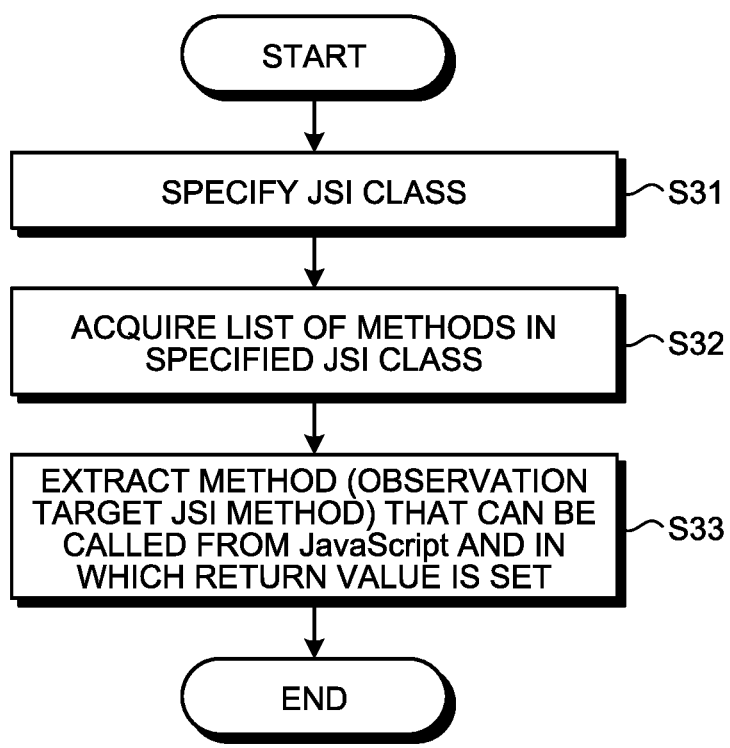
FIG. 10 is a flowchart illustrating the flow of a static code analysis process according to the embodiment.

FIG. 10 is a flowchart illustrating the flow of the static code analysis process performed at Step S3 described above. First, the static code analysis unit 151 specifies the JSI class based on the implementation content of the call code of addJavascriptInterface (Step S31).

Then, the static code analysis unit 151 acquires the list of the methods declared in the specified JSI class (Step S32).

Then, the static code analysis unit 151 specifies, from among the methods declared in the specified JSI class, the method, i.e., the observation target JSI method, that can be called by a JavaScript code and in which a return value is set (Step S33). Consequently, a series of static code analysis process is ended.

Figure 11:
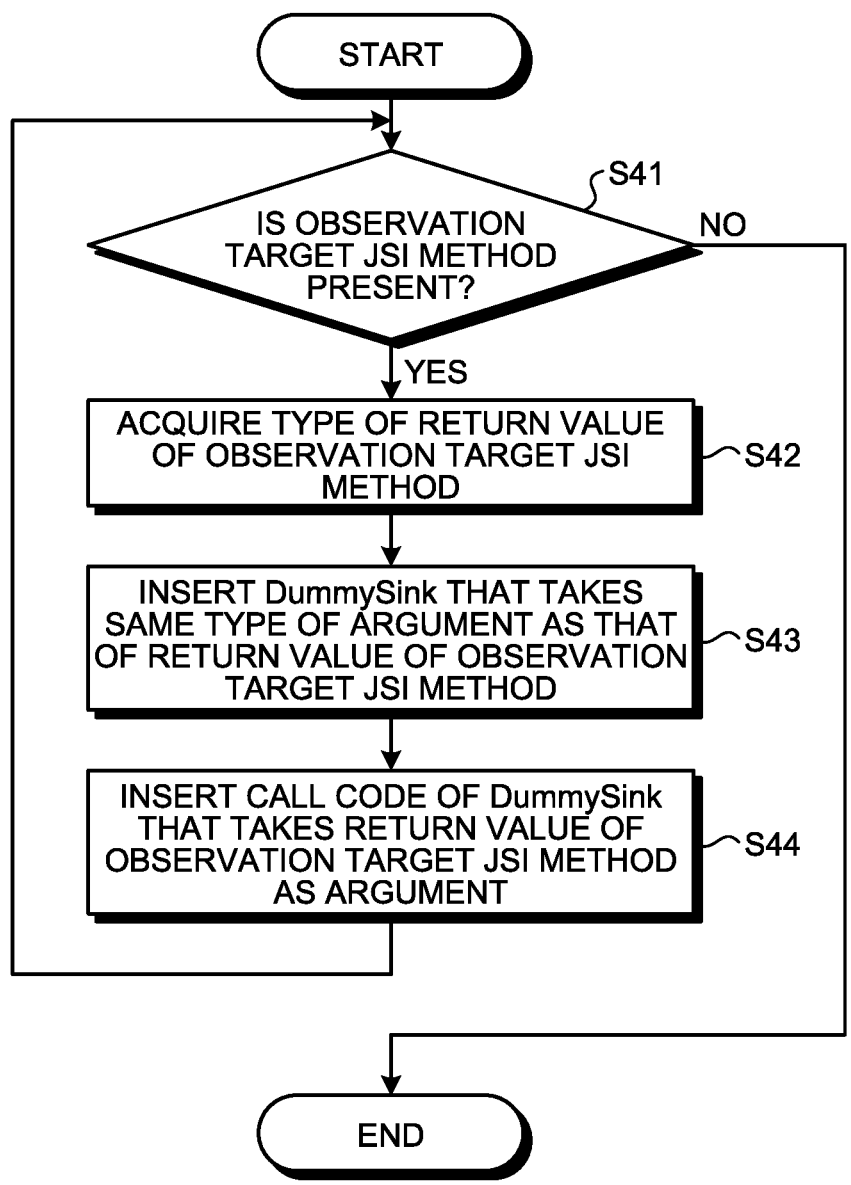
FIG. 11 is a flowchart illustrating the flow of a code conversion process according to the embodiment.

FIG. 11 is a flowchart illustrating the flow of the code conversion process performed at Step S4 described above. If the observation target JSI method is present (Yes at Step S41), the code converting unit 152 acquires the type of the return value of this observation target JSI method (Step S42).

Then, the code converting unit 152 inserts, into the Java code, DummySink in which the type of the argument is allowed to be matched with the type of the return value of the observation target JSI method (Step S43).

Then, the code converting unit 152 inserts, into the Java code, the call code of DummySink in which the return value of the observation target JSI method is set to an argument (Step S44).

Then, the code converting unit 152 returns the process to Step S41 and repeats the process described above as long as the observation target JSI method is present. If the observation target JSI method is not present (No at Step S41), a series of the code conversion process is ended.

Figure 12:
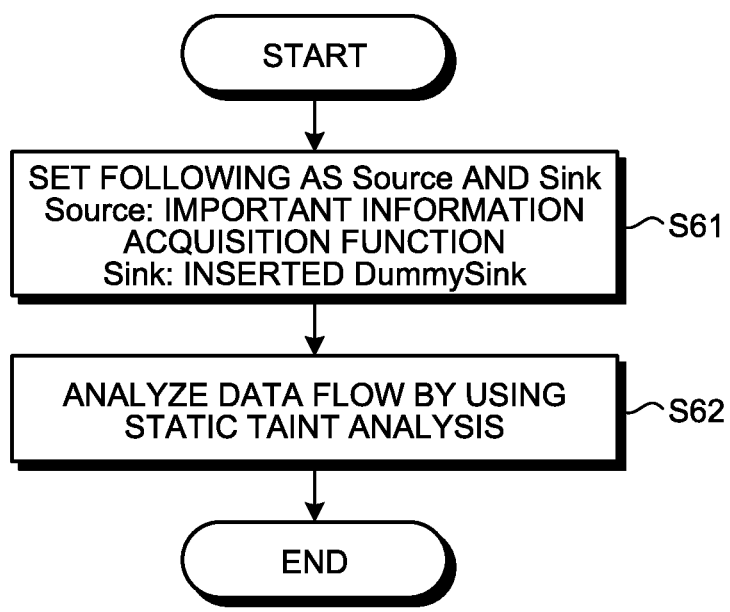
FIG. 12 is a flowchart illustrating the flow of a data flow analysis process according to the embodiment.

FIG. 12 is a flowchart illustrating the flow of the data flow analysis process performed at Step S6 described above. The data flow analysis unit 153 sets an arbitrary function that acquires important information to Source and sets DummySink to Sink (Step S61). Then, the data flow analysis unit 153 analyzes the data flow from Source to Sink by using the static taint analysis technology (Step S62). Consequently, a series of the data flow analysis process is ended.

As described above, in the analysis device 1 according to the embodiment, the static code analysis unit 151 specifies an implementation portion of the Java code of JavascriptInterface that is the cooperation mechanism that sends and receives data between the Android application implemented by the Java code and the Web content implemented by the JavaScript code and specifies a method in which a return value that can be called by the JavaScript code in the cooperation mechanism. Furthermore, the code converting unit 152 inserts, into the Java code, a call code of DummySink in which the return value of the specified method is inserted into an argument. Furthermore, the data flow analysis unit 153 analyzes a data flow by observing the data that is sent and received between the Android application implemented by the Java code and the Web content implemented by the JavaScript code by using an argument and a return value of DummySink and the specified method.

Consequently, the analysis device 1 can detect a data flow from arbitrary Source in the Java code to DummySink. Furthermore, by using the static taint analysis technology in which the data flow between objects in a single code is used as the target, the analysis device 1 can analyze the data flow from Java to JavaScript. Thus, information leakage can be detected without being evaded by an attacker.

Furthermore, the present invention is not limited to the data flow analysis used in a case in which information acquired by Java is sent to an external unit by using JavaScript. For example, in a case in which information acquired by Source in the JavaScript code is sent to an external unit by Sink in the Java code, a call code of a simulation function DummySource in which a return value is set to an argument of Sink is inserted into the Java code. If the data flow from DummySource to Sink is analyzed, it is possible to observe the data flow in a case in which the information acquired by JavaScript is sent to an external unit by Java.

Program

It is also possible to create a program in which the processes performed by the analysis device 1 according to the embodiment described above are described in a language that can be executed by a computer. As an embodiment, the analysis device 1 can be implemented by installing, into a desired computer, an analysis program that executes the above described analysis process as implemented software or online software. For example, by allowing an information processing apparatus to execute the analysis program described above, the information processing apparatus can function as the analysis device 1. The information processing apparatus mentioned here includes a desktop or notebook personal computer. Furthermore, in addition to this, an example of the information processing apparatus includes a mobile communication terminal, such as a smartphone, a mobile phone, a personal handy-phone system (PHS), and a slate terminal, such as a personal digital assistant (PDA). Furthermore, the information processing apparatus may also be implemented as a server device that provides a service related to the analysis process described above to a client that is a terminal device used by a user. For example, the analysis device 1 is implemented as a server device that provides an analysis process service that outputs, when Android application targeted for analysis is input, the execution results of the above described analysis process performed on the Android application. In this case, the analysis device 1 may also be implemented as Webserver or may also be implemented as a cloud that provides the service related to the analysis process described above by outsourcing. In the following, a description will be given of an example of a computer that executes the analysis program that implements the same function as that of the analysis device 1.

Figure 13:
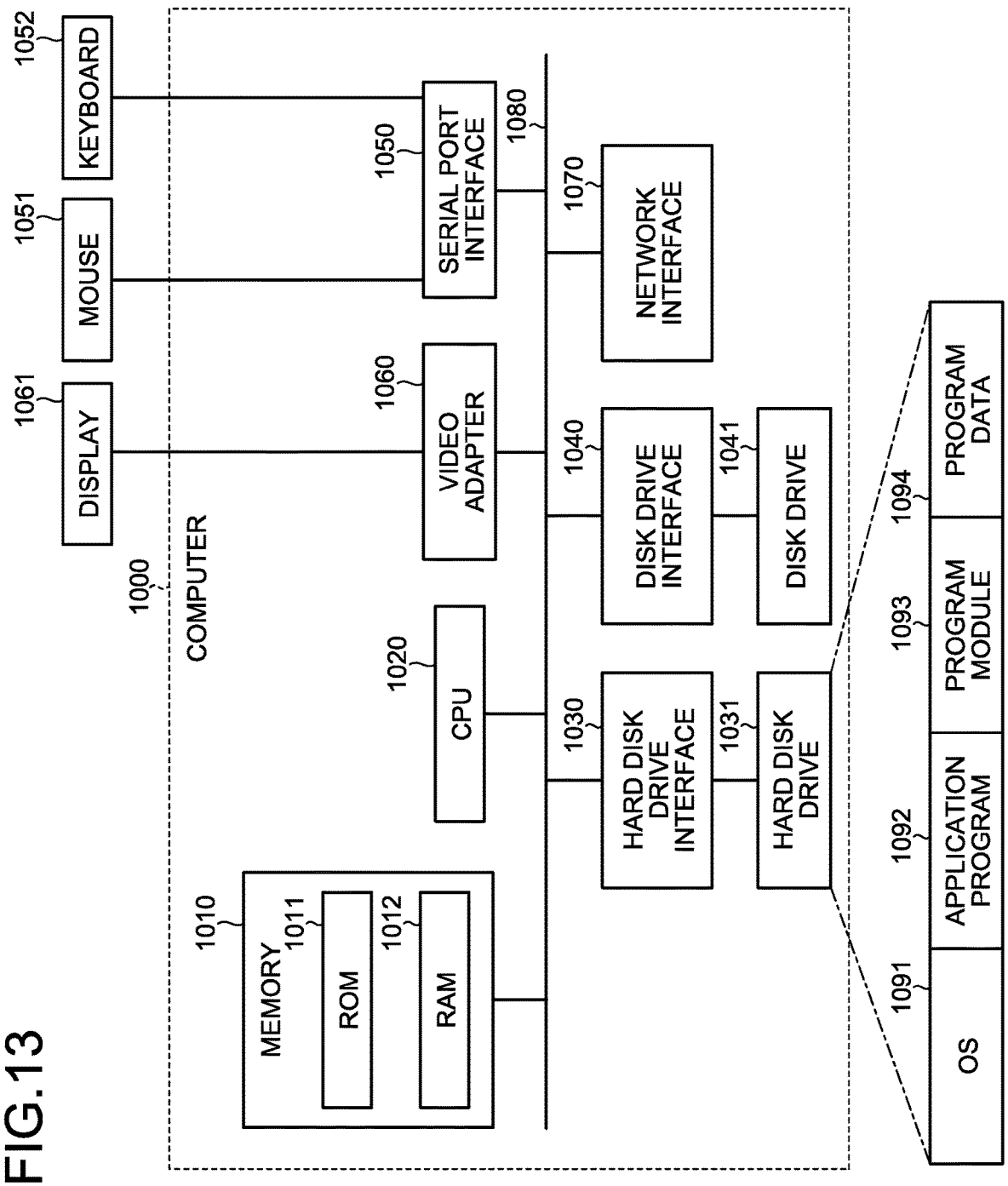
FIG. 13 is a diagram illustrating a computer that executes an analysis program.

As illustrated in FIG. 13, a computer 1000 that executes the analysis program includes, for example, a memory 1010, a CPU 1020, a hard disk drive interface 1030, a disk drive interface 1040, a serial port interface 1050, a video adapter 1060, and a network interface 1070. Each of the units is connected by a bus 1080.

The memory 1010 includes a read only memory (ROM) 1011 and a RAM 1012. The ROM 1011 stores therein, for example, a boot program, such as a basic input output system (BIOS). The hard disk drive interface 1030 is connected to a hard disk drive 1031. The disk drive interface 1040 is connected to a disk drive 1041. In the disk drive 1041, for example, a removable storage medium, such as a magnetic disk or an optical disk, is inserted. A mouse 1051 and a keyboard 1052 are connected to, for example, the serial port interface 1050. A display 1061 is connected to, for example, the video adapter 1060.

Here, as illustrated in FIG. 13, the hard disk drive 1031 stores therein, for example, an OS 1091, an application program 1092, a program module 1093, and a program data 1094. Each of the pieces of data described in the above embodiment is stored in, for example, the hard disk drive 1031 or the memory 1010.

Furthermore, the analysis program is stored in the hard disk drive 1031 as the program module 1093 in which, for example, commands to be executed by the computer 1000 are written. Specifically, the program module 1093 in which the processes performed by the analysis device 1 described in the embodiment are written is stored in the hard disk drive 1031.

Furthermore, data used for information processing by the analysis program is stored in, for example, the hard disk drive 1031 as the program data 1094. Then, the CPU 1020 reads the program module 1093 or the program data 1094 stored in the hard disk drive 1031 onto the RAM 1012 as needed and executes each of the processes described above.

The program module 1093 and the program data 1094 related to the analysis program do not always need to be stored in the hard disk drive 1031 but may be stored in, for example, a removable storage medium and read by the CPU 1020 via the disk drive 1041 or the like. Alternatively, the program module 1093 and the program data 1094 related to the analysis program may also be stored in other computers connected to a network, such as a local area network (LAN) or a wide area network (WAN), and may also be read by the CPU 1020 via the network interface 1070.

In the above, although the embodiment used in the present invention provided by the inventors has been described, the present invention is not limited to the descriptions and drawings that are part of disclosure of the present invention described in the embodiment. Namely, all of other embodiments provided by those skilled in the art based on the embodiments, examples, operation technologies, and the like are included in the present invention.

REFERENCE SIGNS LIST 1 analysis device
11 input unit
12 output unit
13 communication control unit
14 storage unit
15 control unit
151 static code analysis unit
152 code converting unit
153 data flow analysis unit

The invention claimed is:

1. An analysis device comprising:
processing circuitry configured to
specify an implementation portion of a first code, which is a first type of code, in a cooperation mechanism that sends and receives data between an application implemented by the first code and an application implemented by a second code which is a second type of code different from the first type of code and that specifies a method in which a return value that is configured to be called by the second code is set in the cooperation mechanism, wherein the first type of code is Java, the second type of code is JavaScript, and the cooperation mechanism is Javascriptinterface;
insert, into the first code, a call code of a simulation function in which the return value of the specified method is inserted into an argument; and
analyze a data flow by observing, by using the argument and the return value of the simulation function and the specified method, the data that is sent and received between the application implemented by the first code and the application implemented by the second code,
wherein the processing circuitry observes the data that is sent and received between the application implemented by the first code and the application implemented by the second code based on a static taint analysis.

2. The analysis device according to claim 1, wherein the processing circuitry further inserts, into the first code, a call code of a second simulation function in which a return value is inserted in the argument of the method.

3. An analysis method performed by an analysis device comprising:
specifying an implementation portion of a first code, which is a first type of code, in a cooperation mechanism that sends and receives data between an application implemented by the first code and an application implemented by a second code which is a second type of code different from the first type of code and that specifies a method in which a return value that is configured to be called by the second code is set in the cooperation mechanism, wherein the first type of code is Java, the second type of code is JavaScript, and the cooperation mechanism is Javascriptinterface;
inserting, into the first code, a call code of a simulation function in which the return value of the specified method is inserted into an argument; and
analyzing a data flow by observing, by using the argument and the return value of the simulation function and the specified method, the data that is sent and received between the application implemented by the first code and the application implemented by the second code,
wherein the method includes observing the data that is sent and received between the application implemented by the first code and the application implemented by the second code based on a static taint analysis.

4. A non-transitory computer-readable recording medium having stored an analysis program that causes a computer to execute a process comprising:
specifying an implementation portion of a first code, which is a first type of code, in a cooperation mechanism that sends and receives data between an application implemented by the first code and an application implemented by a second code which is a second type of code different from the first type of code and that specifies a method in which a return value that is configured to be called by the second code is set in the cooperation mechanism, wherein the first type of code is Java, the second type of code is JavaScript, and the cooperation mechanism is Javascriptinterface;
inserting, into the first code, a call code of a simulation function in which the return value of the specified method is inserted into an argument; and
analyzing a data flow by observing, by using the argument and the return value of the simulation function and the specified method, the data that is sent and received between the application implemented by the first code and the application implemented by the second cod;
wherein the process includes observing the data that is sent and received between the application implemented by the first code and the application implemented by the second code based on a static taint analysis.

* * * * *